Nov. 16, 1943.  H. SEELBACH, JR  2,334,445
AIR CONDITIONING SYSTEM
Filed June 4, 1942
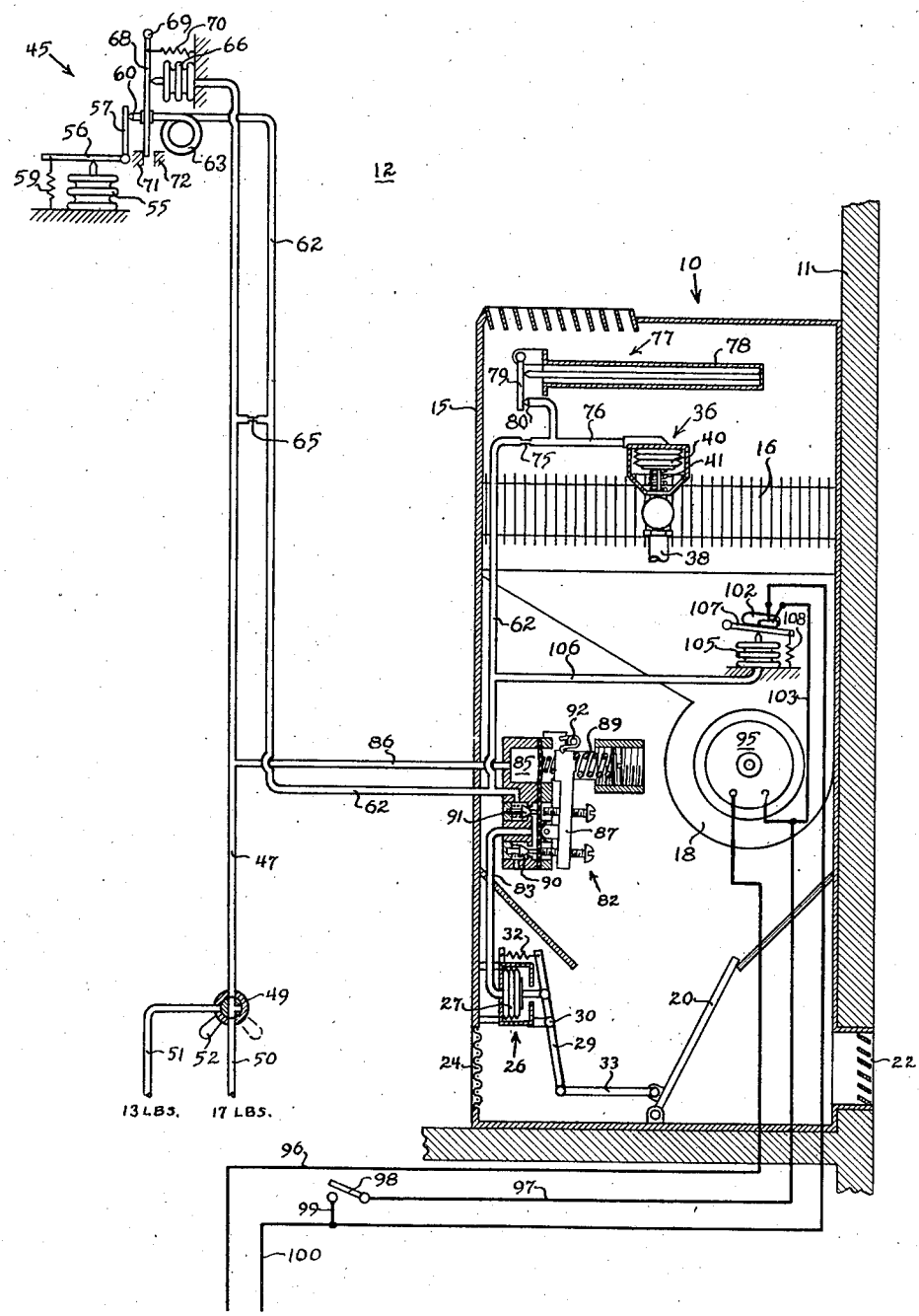
INVENTOR
HERMAN SEELBACH JR.
BY George H Fisher
ATTORNEY Patented Nov. 16, 1943

2,334,445

UNITED STATES PATENT OFFICE 2,334,445

AIR-CONDITIONING SYSTEM

Herman Seelbach, Jr., Hamburg, N. Y., assignor to Minneapolis-Honeywell Regulator Company, Minneapolis, Minn., a corporation of Delaware Application June 4, 1942, Serial No. 445,729

8 Claims. (Cl. 236—38)

The present invention relates to a system for ventilating and controlling the air temperature in a space and is more particularly directed to such a system in which fresh air is supplied to the space only during periods of occupancy thereof.

The invention has particular application to the devices known in the art as unit ventilators. A unit ventilator usually comprises a cabinet located in the space to be heated and ventilated, and includes a heating coil, a fan, and a damper or dampers which control the relative proportions of fresh and recirculated air supplied to the space. The amount of heat supplied by the unit is determined by a room thermostat which may also determine the amount of fresh air supplied by the unit. It is conventional practice to supplement the unit ventilator with direct radiation which is effective only when the heating load exceeds the capacity of the unit ventilator and is also effective to heat the space during periods when the space is not occupied and no fresh air is required, the universal practice being to stop operation of the unit ventilator fan during these periods and place all the heating load on the direct radiation.

By the present invention an arrangement is provided in which the direct radiation commonly used in connection with unit ventilators may be dispensed with or substantially reduced, thereby greatly reducing the cost of such an installation.

An object of the invention is the provision of an air-conditioning system for a space in which, during periods of occupancy, the space temperature is controlled by varying the heat supplied to a heating coil or by varying the amount of fresh air admitted, or both, and in which, during periods of non-occupancy, space temperature is controlled by an intermittent circulation of space air over the heating coil, the flow of fresh air being cut off.

Another object of the invention is to provide a unit ventilator system in which the space thermostat may be remotely changed from one temperature setting during occupancy to a lower temperature setting when not occupied, that operation also acting to move the fresh air damper of the unit ventilator positively to closed position.

Another object of the invention is to provide a unit ventilator system in which the fresh air damper may be removed from thermostatic control and moved to closed position and the unit ventilator fan placed under thermostatic control by manual means remotely located from the unit ventilator.

It is a further object of the invention to provide a pneumatic control system for a unit ventilator in which a change in supply pressure of the control air is effective to change the thermostat setting between a day value and a night value and also to determine whether the fresh air damper is under thermostatic control or is moved positively to closed position.

Further objects will be apparent from the specification and from the single figure of the drawing which shows a unit ventilator system in which the control is pneumatic.

In order to meet various requirements, several unit ventilator control sequences and arrangements have been devised and these have now become relatively standard in the art. In one type of control arrangement the space thermostat controls the effectiveness of the heating coil and the position of the fresh air damper. In another type, the space thermostat controls only the effectiveness of the heating coil and a separate thermostat normally positions the fresh and return air dampers to deliver air at a predetermined temperature to the heating coil. In another type, the space thermostat normally controls only the effectiveness of the heating coil, the fresh-air damper normally being wide open.

One characteristic of all these systems is that during periods of space occupancy the fresh air damper is open to at least a predetermined minimum position. Another common characteristic of these systems is that the effectiveness of the heating coil is varied while the fresh-air damper is at least partly open throughout a major portion of the throttling range of the space thermostat.

The illustrative embodiment of the invention is a system in which, during periods of space occupancy, the heating coil is supplied with successively smaller amounts of heating medium, as the space temperature increases, and on further rise in space temperature, the position of the fresh air damper is modulated between closed and open positions, the fan being run continually. In an actual installation, a fresh-air damper would be provided which would be adapted to supply a minimum quantity of fresh air at all times during periods of space occupancy, but, for reasons of simplicity, this feature is not illustrated. For night operation, or periods of non-occupancy of the space, there is no need for ventilation, the fresh air damper is closed, and space heating is controlled by onand-off operation of the fan to circulate air from the space over the heating coil.

Referring to the drawing, a unit ventilator generally indicated at 10 is located against an outer wall, 11, of a space or room, 12. The present illustration shows a unit ventilator of the "floor type." The unit ventilator 10 comprises a casing 15 which constitutes an air conditioning chamber within which is mounted a heating coil 16, a fan 18 and a combination fresh and return air damper 20. The casing 15 is provided with a fresh air inlet 22 which connects the interior of the unit ventilator with outdoors, and a return air inlet 24 by means of which air from the space being heated may enter the unit ventilator. It will be understood that the damper 20 may be positioned to vary the relative proportions of fresh and return air delivered to the fan 18. In the position shown, no fresh air will be delivered to the fan 18, but as the damper 20 is moved in a counter-clockwise direction, an increasingly greater percentage of fresh air will be admitted.

The damper 20 is controlled by a damper motor 26. Damper motor 26 includes a flexible metal diaphragm 27 which, on an increase in pressure therein, serves to rotate a lever 29 in a clockwise direction about a pivot 30. A tension spring 32 acts on the upper end of the lever 29 to oppose expansion of the bellows 27. An adjustment is preferably provided for the spring 32 in order to determine the pressure within the bellows 27, which will start to move the damper 20 from the position shown. A link 33 serves to connect the lever 29 and the damper 20.

The heating coil 16 is provided with a pressure operated valve 36 which controls the flow of a suitable heating medium, such as steam, to the coil 16 from a pipe 38 which is connected to a suitable source. The valve 36 is of the normally open type and is provided with an expansible diaphragm 40 which on an increase in pressure therein expands downwardly to compress a coil spring 41 and move a valve disc toward closed position.

The relative proportions of fresh and recirculated air, as determined by the position of the damper 20 and the amount of heating medium being supplied to the heating coil 16 are determined by a space thermostat 45 which is located in the room being heated and ventilated. The thermostat 45 is of the type generally known as a day-night thermostat. Air is supplied under pressure to the thermostat 45 through a supply pipe 47. A manually operated three-way valve 49 serves to connect the supply pipe 47 to a source of air pressure of 17 pounds from a pipe 50 when in the position shown. By moving the control handle 52 of the three-way valve 49 to the dotted line position, a supply of air at 13 pounds is transmitted from the pipe 51 to the supply pipe 47. The thermostat 45 may preferably be of the type shown and described in the application of Frederick D. Joesting, Serial No. 350,003, filed August 2, 1940, but for simplicity is shown to be of the flapper valve type. A thermostatic bellows 55 serves to position a lever 56 and thence a flapper valve 57 on changes of temperature. A spring 59 acting on the lever 56 opposed the expansion of the bellows 55 and may be adjustable to determine the temperature at which the flapper valve 57 engages a nozzle 60. The nozzle 60 is connected to a branch line 62 having a flexible loop 63 therein to provide for movement of the nozzle 60. The pipe 62 is connected to the supply pipe 47 through a restriction 65 of a proper size so that as the flapper valve 57 is moved with respect to the nozzle 60, the pressure in the branch line 62 will vary between zero and the pressure existing in the supply pipe 47. It will be understood that various intermediate positions of the flapper valve 57 with respect to the nozzle 60 will produce corresponding intermediate pressures within the pipe 62.

The supply pipe 47 is connected to a second bellows 66, associated with the thermostat 45, the bellows 66 serving to position a lever 68 about a pivot 69 in accordance with supply pipe pressures. A spring 70 opposes clockwise rotation of the lever 68 and is so adjusted that on the higher supply pipe pressure (17 pounds), the lever 68 will be moved into engagement with a stop 71. When the supply pipe pressure is at its lower value (13 pounds), the bellows 66 will collapse sufficiently to move the lever 68 into engagement with a stop 72. The nozzle 60 is carried by the lever 68 and its position therefore depends on the supply pipe pressure. When the lever 68 is in the position shown, the nozzle 60 is moved to a position in which a relatively low temperature at the bellows 55 is necessary in order that the flapper valve 57 will cooperate with the nozzle. This is the night setting of the thermostat. When the air supply pressure is reduced to its lower value, the lever 68 will be moved in a counter-clockwise direction and into engagement with stop 72. In this position, the nozzle 60 is moved away from the flapper valve 57 and a higher temperature at the bellows 55 is necessary in order to move the flapper valve into cooperation with the nozzle 60. This is the day temperature setting of the thermostat.

The pressure in the branch line 62 is transmitted to the valve 36 through a restriction 75 and a pipe 76. The position of the valve 36 will therefore be determined by the temperature in the space 12 unless the temperature of the air being discharged from the heating coil 16 is below a predetermined value. In order to prevent too low a discharge temperature of the air leaving the unit ventilator 10, and a condition in which occupants of the room would feel drafts, a low limit control 77 is provided which is adapted to open the valve 36 and maintain a minimum discharge temperature. The low limit control 77 includes a rod and tube element 78 which positions a flapper valve 79 with respect to a nozzle 80. On abnormally low temperatures, the flapper valve 79 will be moved away from the nozzle 80 to reduce the pressure in the pipe 76 and hence move the valve 36 towards open position.

The diaphragm 27 of the damper motor 26 is connected to a relay 82 by means of a pipe 83. The relay 82 will be briefly described here, it being of the type shown in Figure 9 of Pat. No. 2,280,345, issued to Stanley W. Nicholls. The relay 82 serves to connect the damper motor 26 to the branch line 62 so that the motor 26 will be positioned in accordance with the temperature at the thermostat 45 or to bleed the motor 26 to atmospheric pressure. A diaphragm chamber 85 within the relay 82 is connected to the supply pipe 47 through a pipe 86. When the pressure in the chamber 85 is relatively high, a lever 87 is positioned against the action of a spring 89 to open a bleed valve 90, so that the pressure in the pipe 83 and in the damper motor 26 is reduced to zero. When the pressure in the supply pipe 47 is reduced to its lower value, the pressure will be transmitted to the chamber 85 and the spring 89 will then rotate the lever 87 in a counter-clockwise direction against the pressure in the chamber 85 to close the bleed valve 90 and open a valve 91 to connect the damper motor 26 to the branch line 62 so that it may be positioned by the space thermostat 45. The relay 82 includes a snap action spring 92 which acts on the lever 87 so that it will assume only the two positions described above.

The fan 18 is driven by an electric motor 95. During daytime operation, the motor 95 is supplied with electric current through the wires 96 and 97, a switch 98 being closed to connect the wire 97 through a wire 99 to a supply wire 100. The wires 96 and 100 are connected to a constant source of electric current. During night time operation or during periods when the space is not occupied, the manually operated switch 98 is opened as shown, the fan motor 95 is connected to a source of electric current through a pressure operated switch 102 and a wire 103. The switch 102 is actuated by a bellows 105 which is connected to the branch line 62 through a pipe 106. Bellows 105 positions a lever 107 upon which the switch 102 is mounted so that on a decrease in pressure within the bellows 105, the switch 102 is moved to closed position, while on an increase in pressure in the bellows 105, the switch is moved to open position. A spring 108 acting on the lever 107 is adjusted so that the switch will be actuated at some pressure at which the valve 36 is in open position. For example, this switch may make contact at three pounds and break contact at four pounds pressure in the bellows 105.

The operation of the system during night time or periods of non-occupancy of the space is as follows. The three-way valve 49 is in the position shown so that a relatively high supply pressure is present in the supply pipe 47. This value may be 17 pounds. At this value of supply pressure, the thermostat 45 is adjusted to maintain a relatively low space temperature such as 60° and the pressure in the branch line 62 will vary between zero and 17 pounds, depending on the relative positions of flapper valve 57 and nozzle 60 of the thermostat 45. It will be understood that even though the valve 36 is in open position, little heat will be supplied to the space 12 unless the fan 18 is in operation. Also, during night operation, there is no need for fresh air being supplied to the space so the damper 20 will be positioned as shown. The relatively high pressure of 17 pounds is transmitted to the chamber 85 in the relay 82 to move the lever 87 to the position shown in which the bleed valve 90 is opened, and therefore no pressure is supplied to the damper motor 26, and the damper 20 is moved to a position in which 100% recirculated air is supplied to the fan 18. The heat supplied by the unit ventilator 10 will then depend entirely on operation or non-operation of fan 18. When the space temperatures drop, the pressure in the branch line 62 will also drop until the switch 102 is moved to closed position as shown. In this position, the motor 95 will operate the fan 18 to force air over the heating coil 16 and thence into the space 12. As the space temperature increases, the thermostat 45 will increase the pressure in the branch line 62 and this pressure will be transmitted through the pipe 106 to the bellows 105 to open the switch 102 to stop operation of the fan 18.

When the space 12 is to be occupied, the three-way valve 49 is thrown to a position in which a lower supply pressure is present in the supply pipe 47. This pressure may be 13 pounds. Also, the switch 98 is closed. It may be well to point out here that the three-way valve 49 and the switch 98 are preferably located at a point remote from the space 12 and preferably in the basement or other part of the building where the caretaker may gain ready access to them. It should also be pointed out that the supply pipe 47 may be connected to thermostats and unit ventilators in various other spaces so that manipulation of the three-way valve 49 may place the entire building on either day or night operation. Also, it may be desirable to interconnect the three-way valve 49 and the switch 98 so that a single manual operation will serve to place the system on either day or night operation.

At the lower pressure of 13 pounds in the supply pipe 47, the thermostat 45 will be adjusted to maintain its day temperature setting and the pressure in the branch line 62 will vary between zero and 13 pounds as the flapper valve 57 is moved into and out of engagement with the nozzle 60. When this lower pressure is transmitted to the chamber 85 in the relay 82, the lever 87 will be moved in a counterclockwise direction to close the bleed valve 90 and open the valve 91 to connect the damper motor 26 to the branch line 62. As space temperature increases and the thermostat branch line pressure increases above 4 pounds, steam valve 36 will be positioned towards closed position, and at 8 pounds the supply of steam to the heating coil 16 will be stopped. The spring 32 associated with the damper motor 26 is so selected and adjusted that the damper 20 will be positioned between the position shown in which 100% recirculated air is supplied to the fan 18 and the position in which 100% fresh air is supplied as the branch line pressure varies between 8 and 13 pounds. Through this range of pressure, the steam valve 36 is in its closed position. Likewise, as the temperature in the space 12 drops, the pressure in the branch line 62 will be reduced and the positioning of the steam valve and the damper will be just the reverse of that described above. As the pressure is reduced from 13 and 8 pounds the damper 20 will be moved from the position in which 100% fresh air is supplied to the fan to the position in which 100% return air is supplied to the fan 18, and as the pressure is reduced from 8 to 4 pounds, the steam valve 36 will be moved between closed and open positions.

It will be seen that I have provided a unit ventilator system which may employ any of the common unit ventilator cycles for daytime operation, and one in which the unit ventilator itself serves to supply heat to the space during night operation or during periods when the space is not occupied and when there is no need for supplying fresh air to the space. Various other embodiments of the invention will occur to those skilled in the art, the present embodiment being only for the purpose of illustration. I am therefore to be limited only by the scope of the appended claims.

I claim as my invention:

1. In a system for ventilating and controlling the temperature of the air in a space, in combination, an air-conditioning chamber, a heat exchanger in said chamber, fan means for causing a flow of air into heat exchange relationship with said heat exchanger and into said space, fresh air damper means for admitting fresh air to said chamber, thermal means responsive to the temperature of the air in said space, means operated by said thermal means for varying the rate of heat exchange between the air flowing through said chamber and said heat exchanger in accordance with the temperature of the air in said space, and manual means for causing continuous fan operation or for placing said fan under the control of said thermal means and simultaneously closing said fresh air damper means and maintaining the same closed.

2. In a system for controlling the temperature of the air in a space, in combination, an air-conditioning chamber, a heat exchanger in said chamber, fan means for causing a flow of air into heat exchange relationship with said heat exchanger and into said space, thermal means responsive to the temperature of the air in said space, said thermal means being adapted normally to maintain first predetermined space temperature, means operated by said thermal means for varying the rate of heat exchange between the air flowing through said chamber and said heat exchanger in accordance with the temperature of the air in said space and manual means for causing continuous fan operation or for placing said fan under the control of said thermal means, and simultaneously setting said thermal means to maintain a second predetermined space temperature.

3. In a system for ventilating and controlling the temperature of the air in a space, in combination, an air-conditioning chamber, a heat exchanger in said chamber, fan means for causing a flow of air into heat exchange relationship with said heat exchanger and into said space, fresh air damper means for admitting fresh air to said chamber, thermal means responsive to the temperature of the air in said space, said thermal means being adapted normally to maintain a first predetermined space temperature, means operated by said thermal means for varying the rate of heat exchange between the air flowing through said chamber and said heat exchanger in accordance with the temperature of the air in said space and manual means for causing continuous fan operation or for simultaneously placing said fan under the control of said thermal means, closing said fresh air damper, and setting said thermal means to maintain a second predetermined space temperature.

4. In a system for ventilating and controlling the temperature of the air in a space, in combination, an air-conditioning chamber, a heat exchanger in said chamber, fan means for causing a flow of air into heat exchange relationship with said heat exchanger and into said space, fresh air damper means for admitting fresh air to said chamber, thermal means responsive to the temperature of the air in said space, means operated by said thermal means for varying the rate of heat supply to said heat exchanger in accordance with the temperature of the air in said space and manual means for causing continuous fan operation or for placing said fan under the control of said thermal means and simultaneously closing said fresh air damper means and maintaining the same closed.

5. In a system for controlling the temperature of the air in a space, in combination, an air-conditioning chamber, a heat exchanger in said chamber, fan means for causing a flow of air into heat exchange relationship with said heat exchanger and into said space, thermal means responsive to the temperature of the air in said space, said thermal means being adapted normally to maintain a first predetermined space temperature, means operated by said thermal means for varying the rate of heat supply to said heat exchanger in accordance with the temperature of the air in said space and manuel means for causing continuous fan operation or for placing said fan under the control of said thermal means and simultaneously setting said thermal means to maintain a second predetermined space temperature.

6. In a system for ventilating and controlling the temperature of the air in a space, in combination, an air-conditioning chamber, a heat exchanger in said chamber, fan means for causing a flow of air into heat exchange relationship with said heat exchanger and into said space, fresh air damper means for admitting fresh air to said chamber, thermal means responsive to the temperature of the air in said space, said thermal means being adapted normally to maintain a first predetermined space temperature, means operated by said thermal means for varying the rate of heat supply to said heat exchanger in accordance with the temperature of the air in said space and manuel means for causing continuous fan operation or for simultaneously placing said fan under the control of said thermal means, closing said fresh air damper, and setting said thermal means to maintain a second predetermined space temperature.

7. The method of ventilating and controlling the temperature of the air in a space which comprises continually forcing fresh air over a heating surface and into the space, varying the rate of heat exchange between the air and the heating surface in accordance with the space temperature during periods when the space is normally occupied, forcing space air over the heating surface in accordance with space temperature during periods when the space is not normally occupied, and varying the rate of heat exchange between the space air and the heating surface in accordance with space temperature during those periods when the space is not normally occupied.

8. The method of ventilating and controlling the temperature of the air in a space which comprises continually forcing fresh air over a heating surface and into the space, varying the rate of heat exchange between the air and the heating surface in accordance with the space temperature when the space temperature is within a predetermined range and varying the flow of fresh air when the space temperature falls below that predetermined range during periods when the space is normally occupied, forcing space air over the heating surface in accordance with space temperature during periods when the space is not normally occupied, and varying the rate of heat exchange between the space air and the heating surface in accordance with space temperature during those periods when the space is not normally occupied.

HERMAN SEELBACH, JR.